(12) United States Patent
Montagne

(10) Patent No.: US 7,171,075 B2
(45) Date of Patent: Jan. 30, 2007

(54) LUMINAIRE AND DYNAMIC ROAD-MARKING UNIT

(75) Inventor: Louis Montagne, Cailloux sur Fontaines (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 11 days.

(21) Appl. No.: 10/518,831

(22) PCT Filed: Jun. 4, 2003

(86) PCT No.: PCT/IB03/02487

§ 371 (c)(1),
(2), (4) Date: Dec. 21, 2004

(87) PCT Pub. No.: WO2004/003613

PCT Pub. Date: Jan. 8, 2004

(65) Prior Publication Data

US 2005/0201678 A1    Sep. 15, 2005

(30) Foreign Application Priority Data

Jun. 28, 2002 (EP) .................................. 02291619

(51) Int. Cl.
*G02B 6/26* (2006.01)
*F21V 7/09* (2006.01)
(52) U.S. Cl. .......................... 385/31; 385/38; 362/558; 362/609

(58) Field of Classification Search ................... 385/31, 385/38; 362/609, 551, 558
See application file for complete search history.

(56) References Cited

U.S. PATENT DOCUMENTS

| | | | | |
|---|---|---|---|---|
| 5,607,229 A | * | 3/1997 | Rykowski et al. | 362/346 |
| 5,857,041 A | | 1/1999 | Riser et al. | |
| 5,971,571 A | * | 10/1999 | Rose | 362/346 |
| 6,385,371 B1 | * | 5/2002 | Li | 385/43 |
| 6,418,253 B2 | * | 7/2002 | Whitehead | 385/31 |

FOREIGN PATENT DOCUMENTS

| | | |
|---|---|---|
| EP | 0615094 A1 | 9/1994 |
| WO | WO0192641 A1 | 12/2001 |

* cited by examiner

*Primary Examiner*—John D. Lee

(57) ABSTRACT

A luminaire 1 comprising a light-directing element 3, e.g. a reflector, having a light emission window 5. Said reflector has a shape for directing light originating from an electric light source 7 into an optical fiber system 9 positioned in front of the light emission window. The optical fiber system comprises a bundle of optical fibers 11. Said shape is calculated in accordance with a ray-tracing algorithm which takes into account that said light source is voluminous, e.g. a Light Emitting Diode. The reflector has a shape which is composed of n solids of revolution of parabolic sectors 13, wherein said (adjoining) parabolic sectors form an integral surface 15. The invention further relates to a dynamic road marking unit 19.

8 Claims, 2 Drawing Sheets

LUMINAIRE AND DYNAMIC ROAD-MARKING UNIT

The invention relates to a luminaire comprising:

a light-directing element having a light emission window, said light-directing element having a shape for directing light, which light originates from an electric light source to be accommodated, into an optical fiber system.

The invention further relates to a dynamic road marking unit.

Such a luminaire is known from EP-615094. In the known luminaire the light-directing element is a reflective surface of a concavely shaped reflector, the light source being arranged on an optical axis of the reflector. The shape of the reflective surface is calculated with an algorithm and is thus optimized with respect to coupling light into a light entrance surface of an optical fiber system. The algorithm further takes into account that the luminous intensity has to be constant as much as possible across the light entrance surface of the optical fiber system. Thus a highly efficient light output of the system is obtained. However, it was found that the known luminaire still has as a disadvantage that the algorithm used does not yield an optimized shape for the reflective surface for the accommodated light sources. As a result the efficiency and uniformity of the known luminaire is not optimal for the accommodated light sources.

It is an object of the invention to obtain a luminaire of the type as described in the opening paragraph in which the disadvantage is counteracted. The luminaire according to the invention is for this purpose characterized in that said shape is calculated in accordance with a ray-tracing algorithm which takes into account that said light source to be accommodated is voluminous. Ray-tracing is a method of creating images on a computer using software. Input data for the algorithm are objects and light source characteristics, specified with respect to shape, position, color, and texture and position of the light source. The software mathematically models light rays, either reflected and/or refracted. Part of the data input may be realized, for example, by using an interactive modeling system, such as a CAD software package. In the algorithm used to determine the shape of the reflective surface of the known luminaire, said shape is optimized for a light source which is infinitely small, i.e. a light source which is considered as a point and without taking into account characteristics of the optical fiber. However, in practice a light source always has a finite dimension, i.e. is voluminous, and the optical fiber characteristics change the way of optimization. The inventive measure, has the advantage that it is made possible in a relatively simple way via iterative steps in the calculation to design and obtain a shape of the reflective surface such that light from a voluminous light source can be coupled via an entrance into an optical fiber system with a relatively high efficiency and with a relatively constant luminous intensity. The entrance of the optical fiber system is taken as a two-dimensional matrix of elementary surfaces. Efficiency and intensity distribution uniformity are determined by calculation and comparison of the light incident on each respective elementary surface. The voluminous light source is accounted for in the ray tracing method by data input from a real measurement of a voluminous light source, and subsequently said voluminous light source is considered as a plurality of luminous point sources. A compromise solution is calculated for said point sources which is satisfactory primarily with respect to efficiency and secondarily with respect to intensity distribution uniformity. It is an additional advantage of the inventive luminaire that it allows the use of a light-directing element which is small compared with the light source, while a high efficiency and homogeneity of the light intensity distribution are maintained.

A relatively simple and relatively easily calculation of the shape of the reflective surface, which shape is relatively easy to manufacture as well, is obtained if the shape is construed from n solids of revolution of parabolic sectors, wherein the adjoining parabolic sectors form an integral surface, i.e. a surface which is smooth and is free from disruptions. Calculation time is reduced, and it is especially simple if the parabolic sectors are calculated and optimized one after the other. In particular, the following sets of equations for defining each parabolic sector are appropriate:

$$a(i)=(z(i)-z(i+1))/(x(i)^2-x(i+1)^2)$$

$$b(i)=a(i)$$

$$c(i)=(x(i)^2*z(i+1))-((x(i+1)^2*z(i))/(x(i)^2-x(i+1)^2)$$

wherein:

a(i), b(i) and c(i) are polynomial coefficients of the parabolic sectors such that coordinates of each point of the reflective surface fulfill the condition:

$$a(i)*x^2+b(i)*y^2-z+c(i)=0;$$

x, y, z are coordinates of the $i^{th}$ surface of revolution of the parabola in a linear x, y, z tri-coordinate system;

the coordinates x(i), z(i), x(i+1), z(i+1) are limits of the $i^{th}$ parabolic sector in a plane xz;

i is an integer from 1 to n.

Calculations with various coefficients and coordinates, hence various defined parabolic sectors, render it possible to determine appropriate light-directing elements with respect to efficiency and homogeneity of the light distribution.

Said calculation is usable for a luminaire in which the light-directing element is chosen from the group consisting of a reflector, a refractor, and a combination thereof. Each type of light-directing element requires a specific calculation, for example where a refractor is involved, the refractive index of the material of which the refractor is made has to be accounted for. As said light-directing elements can be relatively small with respect to the light source, the use of said element in relatively small luminaires is made possible. Hence, a combination of said luminaire with a relatively small light source, i.e. an electric lamp with a small light-generating element, is preferable. Light sources having said small light-generating element are, for example, Light Emitting Diodes and high intensity discharge lamps, i.e. lamps with a pair of mutually opposed electrodes that define and electrode path of a certain length, for example a length of 3 mm. Light Emitting Diodes have the additional advantage over high intensity discharge lamps that synthetic materials can be used for the entrance of the optical fiber system, as a relatively low temperature is obtained during operation of the luminaire with Light Emitting Diodes.

In the inventive luminaire, the luminous intensity coupled into an optical fiber system is relatively constant across the surface for a voluminous light source. As a result, the inventive luminaire is particularly suitable for the case in which the optical fiber system comprises a bundle of optical fibers, as in said case each respective fiber is provided with light of practically the same intensity or luminous flux. Light from one light source can thus emerge from optical fiber ends in several locations with practically the same intensity. In this respect a further improvement of the calculation, and thus the shape of the light-directing element, is obtained when the ray-tracing algorithm takes account of the path length of each wave through the respective fiber, according to the following formula:

efficacy of respective ray=1/(10^(length of fiber/cos (angle of incidence at entrance of fiber)*attenuation(λ)/10))

wherein λ=wavelength in the range from 380–780 nm.

Said further improvement can be even further enhanced if the algorithm considers the radius of curvature of the optical fibers, i.e. according to the formula:

theta curve=arc-cosine (Internal radius of curvature/ (Internal radius of curvature+monofiber diameter))

Thus, criteria of angle of incidence of each respective ray, fiber attenuation for each respective optical fiber of the bundle of optical fibers, and radius of curvature of the optical fibers are accounted for. The calculation comprises steps accounting as well for dependency of the refractive index on the wavelength range to be guided through the optical fibers. When a glass rod is provided at the end of the optical fiber, a still further improved homogeneous intensity of the light distribution is attained. Providing light of practically the same intensity to several locations is applicable in luminaires used in dynamic road marking systems. In this respect it is favorable when the luminaire has a shaped housing adapted to fit a saw-cut recess for accommodating the unit. Such a luminaire can be provided in a road surface in a relatively simple way. Providing said glass rod at said end offers the additional advantage that the optical fiber is protected from damage/pollution thereby, which is of particular importance in dynamic road marking systems.

These and other aspects of the invention will be apparent from and elucidated with reference to the embodiments described hereinafter in a drawing, wherein.

Figure 1:
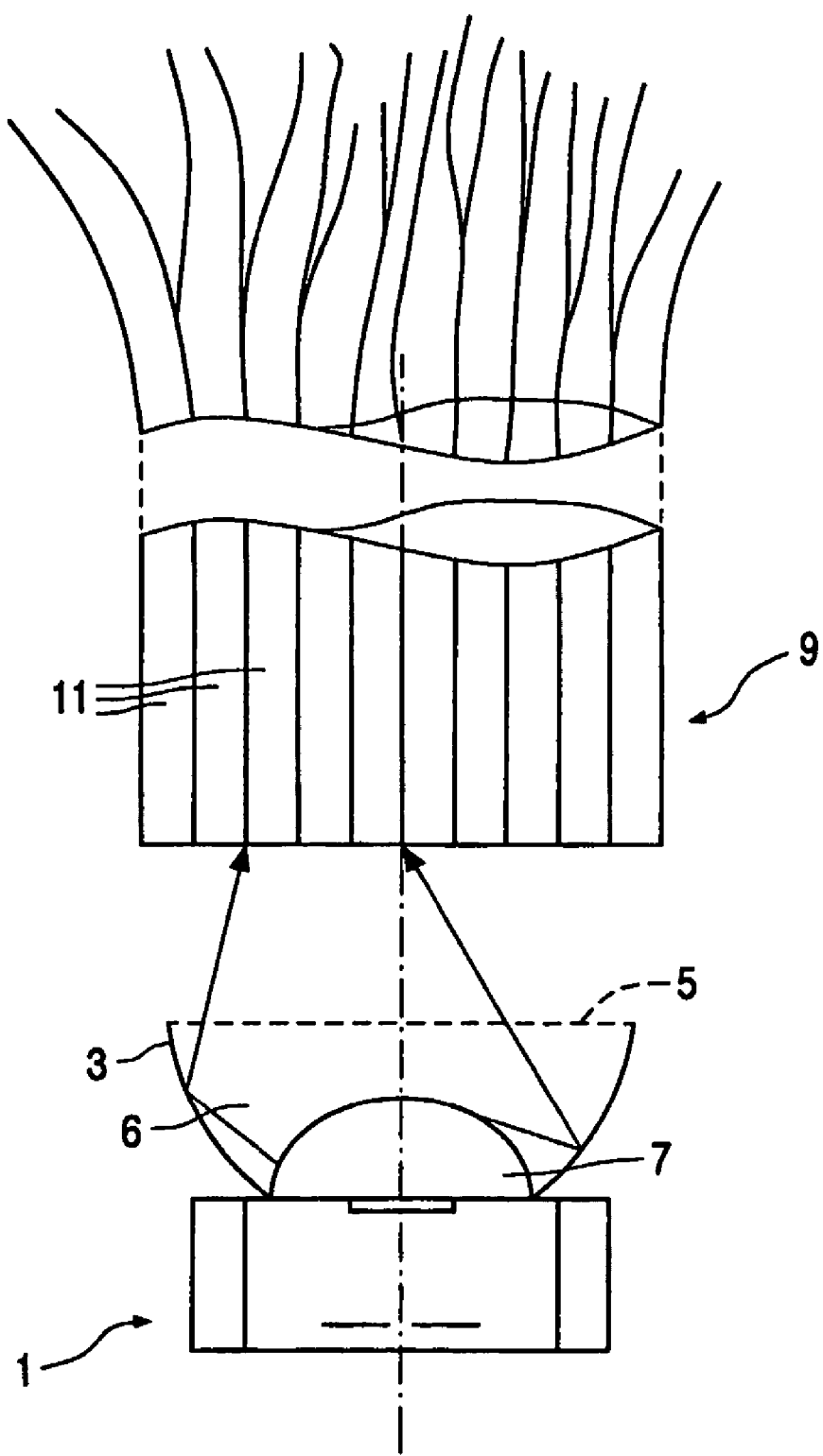
FIG. 1 shows a schematic arrangement of a luminaire according to the invention and an optical fiber harness.

FIG. 1 shows a luminaire 1 comprising a light-directing element 3, a reflector in the Figure, having a light emission window 5 and having a space 6 enclosed by the light-directing element and its light emission window, in which space a light source 7 is arranged. Said reflector has a shape for directing light originating from the electric light source 7 into an optical fiber system 9 positioned in front of the light emission window. The optical fiber system comprises a bundle of optical fibers 11. Said shape is calculated according to a ray-tracing algorithm which takes into account that said light source is voluminous. In the Figure, the electric light source is a Light Emitting Diode. It is further shown that the reflector is relatively small compared to the light source.

Figure 2:
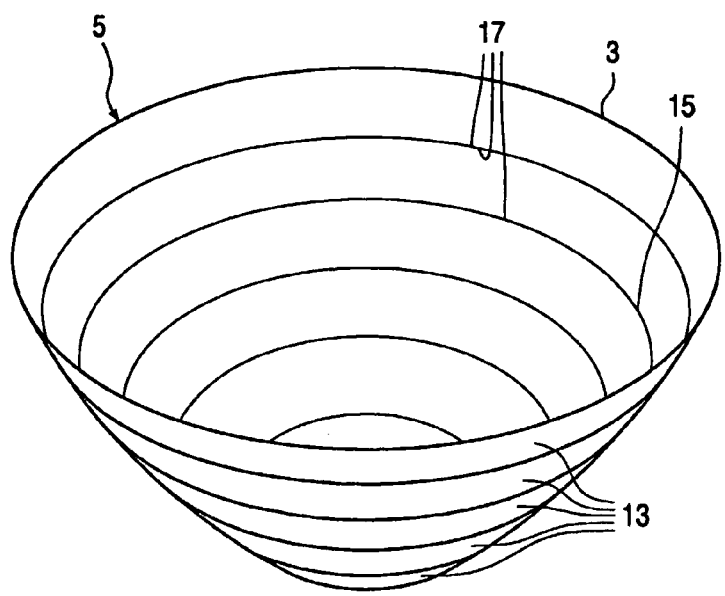
FIG. 2 shows a schematic construction of a reflector body of a luminaire according to the invention.

FIG. 2 is a perspective view of a reflector 3 of a luminaire according to the invention with a light emission window 5. The reflector has a shape which is made of five solids of revolution of parabolic sectors 13 defining a surface 15. The surface 15 is smooth and is free from disruptions at borders 17 of adjoining parabolic sectors. The parabolic sectors are parts of a parabola defined by the following set of equations:

$a(i)=(z(i)-z(i+1))/(x(i)^2-x(i+1)^2)$ $b(i)=a(i)$ $c(i)=(x(i)^2*z(i+1))-((x(i+1)^2*z(i))/(x(i)^2-x(i+1)^2)$ wherein:

a(i), b(i) and c(i) are polynomial coefficients of the parabolic sectors such that coordinates of each point of the reflective surface fulfill the condition:

$a(i)*x^2+b(i)*y^2-z+c(i)=0;$ x, y, z are coordinates of the ith surface of revolution of the parabola in a linear x, y, z tri-coordinate system;

the coordinates x(i), z(i), x(i+1), z(i+1) are limits of the ith parabolic sector in a plane xz;

in the case of FIG. 2, i is an integer from 1 to 5.

Figure 3:
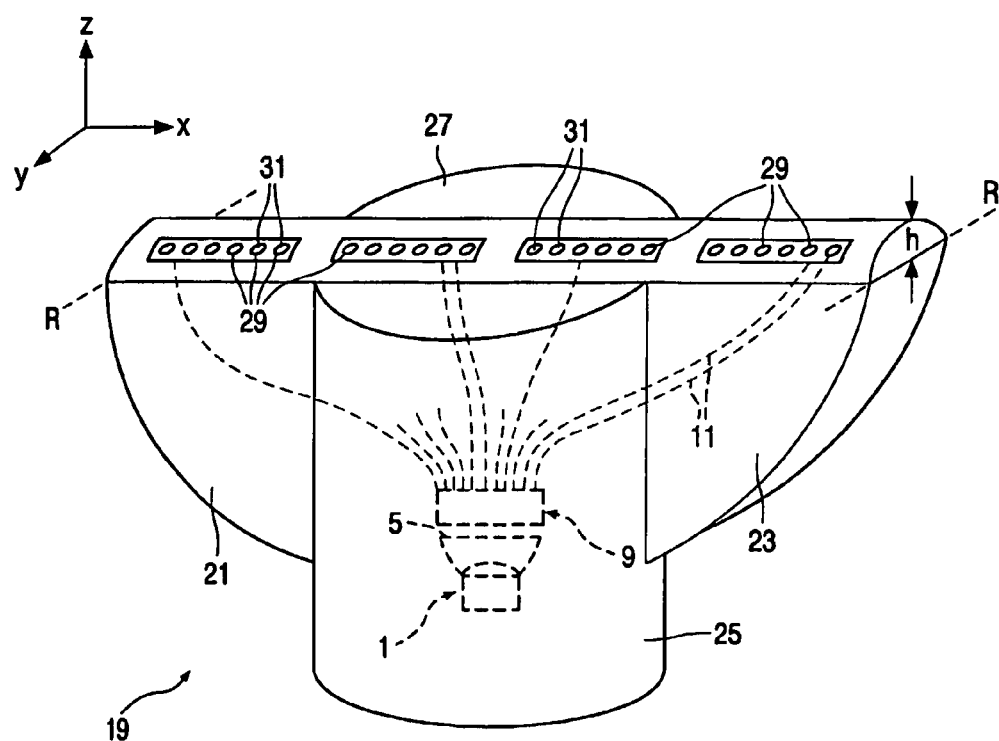
FIG. 3 shows a dynamic road marking unit comprising the luminaire of FIG. 1.

FIG. 3 shows an embodiment of a dynamic road marking unit 19 having a housing 21 with a shape which is a combination of a circular segment cylinder 23 and a circular cylinder 25 perpendicular to an emission surface 27. The circular cylinder part of the unit accommodates the luminaire 1 and the optical fiber system 9 of FIG. 1. The optical fibers 11 of the optical fiber system extend from adjacent the emission window 5 of the luminaire to openings 29 in the emission surface. Each opening is closed by a glass rod 31, the glass rod thus being positioned at an end of a respective optical fiber. The emission surface of the unit projects above road surface R by a height h, h being in a range from 2 to 5 mm.

The invention claimed is:

1. A luminaire comprising:
a light-directing element having a light emission window,
said light-directing element having a shape for directing light, which light originates from an electric light source to be accommodated, into an optical fiber system,
wherein said shape is calculated in accordance with a ray-tracing algorithm which takes into account that said light source to be accommodated is voluminous,
wherein said shape is composed of n solids of revolution of parabolic sectors, wherein adjoining parabolic sectors form an integral surface and wherein said parabolic sectors are parts of parabola defined by the following set of equations:

$a(i)=(z(i)-z(i+1))/(x(i)^2-x(i+1)^2)$ $b(i)=a(i)$ $c(i)=(x(i)^2*z(i+1)-((x(i+1)^2*z(i))/(x(i)^2-x(i+1)^2)$ wherein:
a(i), b(i) and c(i) are polynomial coefficients of the parabolic sectors such that coordinates of each point of the reflective surface fulfill the condition:

$a(i)*x^2+b(i)*y^2-z+c(i)=0;$ x, y, z are coordinates of the $i^{th}$ surface of revolution of the parabola in a linear x, y, z tri-coordinate system;

the coordinates x(i), z(i), x(i+1), z(i+1) are limits of the $i^{th}$ parabolic sector in a plane xz;

i is an integer from 1 to n.

2. A luminaire according to claim 1, wherein the light-directing element is chosen from the group consisting of a reflector, a refractor, and a combination thereof.

3. A luminaire according to claim 1, wherein the light source is an electric lamp.

4. A luminaire according to claim 3, wherein the electric lamp is a Light Emitting Diode.

5. A luminaire according to claim 1, wherein the optical fiber system comprises a bundle of optical fibers.

6. A luminaire according to claim 5, wherein a glass rod is positioned at an end of the optical fiber.

7. A dynamic road-marking unit comprising a luminaire according to claim 1.

8. A dynamic road-marking unit according to claim 7, wherein the luminaire has a shaped housing adapted to fit a saw-cut recess for accommodating the unit.

* * * * *